US009067833B2

(12) United States Patent
Rowe

(10) Patent No.: US 9,067,833 B2
(45) Date of Patent: Jun. 30, 2015

(54) IRON OXIDE AND SILICA MAGNETIC CORE

(75) Inventor: Michael Paul Rowe, Pinckney, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 210 days.

(21) Appl. No.: 13/529,316

(22) Filed: Jun. 21, 2012

(65) Prior Publication Data

US 2013/0342069 A1 Dec. 26, 2013

(51) Int. Cl.
| | |
|---|---|
| *H02K 1/06* | (2006.01) |
| *H01F 1/36* | (2006.01) |
| *C08K 3/20* | (2006.01) |
| *C04B 35/628* | (2006.01) |
| *C01G 49/08* | (2006.01) |
| *H01F 27/255* | (2006.01) |
| *H01F 41/02* | (2006.01) |
| *B82Y 30/00* | (2011.01) |
| *H01F 1/00* | (2006.01) |

(52) U.S. Cl.
CPC ....... *C04B 35/62807* (2013.01); *Y10T 428/268* (2015.01); *B82Y 30/00* (2013.01); *C04B 2235/3272* (2013.01); *C04B 2235/441* (2013.01); *C04B 2235/5454* (2013.01); *C01G 49/08* (2013.01); *C01P 2002/72* (2013.01); *C01P 2004/04* (2013.01); *C01P 2004/64* (2013.01); *C01P 2004/84* (2013.01); *H01F 27/255* (2013.01); *H01F 41/0246* (2013.01); *H01F 1/0063* (2013.01)

(58) Field of Classification Search
CPC .................................. B32B 1/00; C08K 3/34
USPC ............. 310/216.066; 428/323, 404; 524/442
See application file for complete search history.

(56) References Cited

U.S. PATENT DOCUMENTS

| | | | |
|---|---|---|---|
| 4,309,459 A | 1/1982 | Tokuoka | |
| 4,601,765 A | 7/1986 | Soileau et al. | |
| 4,920,010 A | 4/1990 | Kadono et al. | |
| 5,225,281 A | 7/1993 | Tamai et al. | |
| 5,451,245 A | 9/1995 | Nomura et al. | |
| 5,512,317 A | 4/1996 | Blagev | |
| 6,551,659 B1 * | 4/2003 | Clough | 427/217 |
| 7,678,174 B2 | 3/2010 | Tokuoka et al. | |
| 2003/0077448 A1 | 4/2003 | Ueta et al. | |
| 2004/0249037 A1 * | 12/2004 | Kolbe et al. | 524/401 |
| 2005/0074600 A1 * | 4/2005 | Ma et al. | 428/328 |
| 2006/0283290 A1 | 12/2006 | Hattori et al. | |
| 2007/0281160 A1 * | 12/2007 | Krishna et al. | 428/403 |
| 2009/0297615 A1 * | 12/2009 | Wang et al. | 424/490 |

(Continued)

OTHER PUBLICATIONS

U.S. Appl. No. 13/921,878, filed Jun. 19, 2013, Rowe.

(Continued)

*Primary Examiner* — Jose Gonzalez Quinone
(74) *Attorney, Agent, or Firm* — Oblon, McClelland, Maier & Neustadt, L.L.P.

(57) ABSTRACT

A magnetic core of superparamagnetic core shell nanoparticles having a particle size of less than 50 nm; wherein the core is an iron oxide and the shell is a silicon oxide is provided. The magnetic core is a monolithic structure of superparamagnetic core grains of iron oxide directly bonded by the silicon dioxide shells. A method to prepare the magnetic core which allows maintenance of the superparamagnetic state of the nanoparticles is also provided. The magnetic core has little core loss due to hysteresis or eddy current flow.

9 Claims, 3 Drawing Sheets

(56) References Cited

U.S. PATENT DOCUMENTS

| | | |
|---|---|---|
| 2010/0054981 A1 | 3/2010 | Liu |
| 2011/0104476 A1 | 5/2011 | Toyoda et al. |
| 2011/0207869 A1* | 8/2011 | Katusic et al. ............... 524/442 |

OTHER PUBLICATIONS

U.S. Appl. No. 13/900,860, filed May 23, 2013, Rowe.
U.S. Appl. No. 13/565,250, filed Aug. 2, 2012, Rowe.
U.S. Appl. No. 13/558,397, filed Jul. 26, 2012, Rowe.
U.S. Appl. No. 13/942,116, filed Jul. 15, 2013, Rowe, et al.
Chih Hao Yu, et al., "Immobilization of BSA on Silica-Coated Magnetic Iron Oxide Nanoparticle" J. Phys. Chem. C, vol. 113, No. 2, (p. 537-543), 2009.
Shin Tajima, et al., "Properties of High-Density Magnetic Composite Fabricated From Iron Powder Coated with a New Type Phosphate Insulator" IEEE Transactions on Magnetics, vol. 41, No. 10, (p. 3280-3282), Oct. 2005.
Shouheng Sun, et al., "Size-Controlled Synthesis of Magnetite Nanoparticles" J. Am. Chem. Soc., vol. 124, No. 28, (p. 8204-8205), 2002.
A Bumb, et al., "Synthesis and Characterization of Ultra-Small Superparamagnetic Iron Oxide Nanoparticles Thinly Coated with Silica" Nanotechnology 19 (2008) 335601 (6 pg.).
U.S. Appl. No. 14/270,619, filed May 6, 2014, Rowe, et al.
U.S. Appl. No. 14/270,752, filed May 6, 2014, Rowe, et al.
U.S. Appl. No. 14/252,036, filed Apr. 14, 2014, Rowe, et al.
U.S. Appl. No. 14/296,917, filed Jun. 5, 2014, Rowe, et al.
U.S. Appl. No. 14/521,063, filed Oct. 22, 2014, Rowe, et al.

* cited by examiner

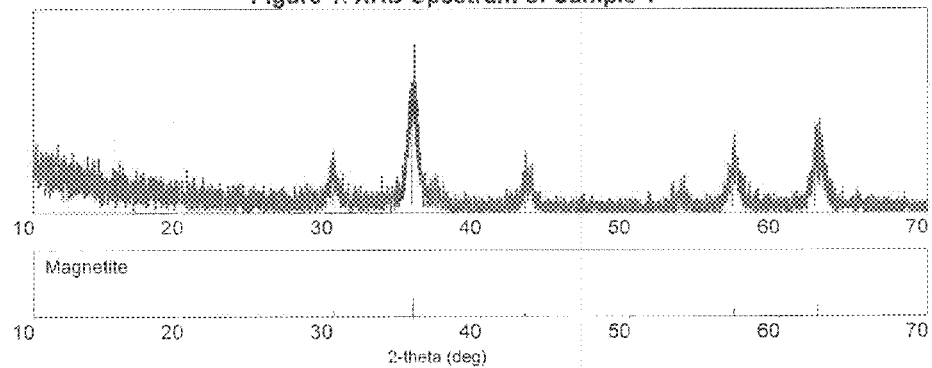
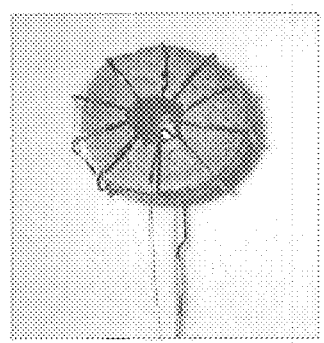
Fig. 2

A - Single domain particles
B - Multi domain particles
C - Range of superparamagnetism

IRON OXIDE AND SILICA MAGNETIC CORE

BACKGROUND OF THE INVENTION

1. Field of the Invention

The present invention relates to a magnetic core having performance and stability properties which make the core particularly suitable for utility in power generation parts such as stators, rotors, armatures and actuators or any device whose function is dependent upon an efficient magnetic core, i.e., a magnetic core having minimal magnetic hysteresis and no or little eddy current formation.

2. Discussion of the Background

Magnetic materials generally fall into two classes which are designated as magnetically hard substances which may be permanently magnetized or soft magnetic materials which may be reversed in magnetism at low applied fields. It is important in soft magnetic materials that energy loss, normally referenced as "core loss" is kept to a minimum whereas in hard magnetic materials it is preferred to resist changes in magnetization. High core losses are therefore characteristic of permanent magnetic materials and are undesirable in soft magnetic materials.

Soft magnetic core components are frequently used in electrical/magnetic conversion devices such as motors, generators and transformers and alternators, particularly those found in automobile engines. The most important characteristics of soft magnetic core components are their maximum induction, magnetic permeability, and core loss characteristics. When a magnetic material is exposed to a rapidly varying magnetic field, a resultant energy loss in the core material occurs. These core losses are commonly divided into two principle contributing phenomena: hysteresis and eddy current losses. Hysteresis loss results from the expenditure of energy to overcome the retained magnetic forces within the core component. Eddy current losses are brought about by the production of induced currents in the core component due to the changing flux caused by alternating current (AC) conditions.

The use of powdered magnetic materials allows the manufacture of magnetic parts having a wide variety of shapes and sizes. Conventionally, however, these materials made from consolidated powdered magnetic materials have been limited to being used in applications involving direct currents. Direct current applications, unlike alternating current applications, do not require that the magnetic particles be insulated from one another in order to reduce eddy currents.

Conventionally, magnetic device parts are constructed from powders by compaction of the powders to a defined shape and then sintering the compact at temperatures of 600° C. or higher. Sintering the part following compaction, is necessary to achieve satisfactory mechanical properties in the part by providing particle to particle bonding and hence strength. However, sintering may cause volume changes and results in a manufacturing process with poor dimensional control.

In other conventional processes designed to prepare parts having minimum eddy current losses, the magnetic particles are coated with thermoplastic materials before pressing. The plastic is provided to act as a barrier between the particles to reduce induced eddy current losses. However, in addition to the relatively high cost of such coatings, the plastic has poor mechanical strength and as a result, parts made using plastic-coated particles have relatively low mechanical strength. Additionally, many of these plastic-coated powders require a high level of binder when pressed. This results in decreased density of the pressed core part and, consequently, a decrease in magnetic permeability and lower induction. Additionally, and significantly, such plastic coatings typically degrade at temperatures of 150-200° C. Accordingly, magnetic parts made in such manner are generally limited to utility in low stress applications for which dimensional control is not critical.

Thus, there remains a need for magnetic powders to produce soft magnetic parts, having increased green strength, high temperature tolerance, and good mechanical properties, which parts have minimal or essentially no core loss.

Conventionally, ferromagnetic powders have been employed for the production of soft magnetic core devices. Such powders are generally in a size range measured in microns and are obtained by a mechanical milling diminution of a bulk material. Superparamagnetic nanoparticle materials having particle size of less than 100 nm have found utility for magnetic record imaging, as probes for medical imaging and have been applied for targeted delivery of therapeutic agents. However, the utilization of superparamagnetic powders for production of core magnetic parts has until now, been limited.

For example, Toyoda et al. (U.S. 2011/0104476) describe a soft magnetic material of iron or an iron alloy particle having a grain size of from 5 to 400 μm which is provided with an oxide insulative coating including silicon oxide. The coated particles are mixed with an organic substance which is a non-thermoplastic resin and at least one of a thermoplastic resin and a higher fatty acid. The content of the organic substance in the mixed material is from 0.001 to 0.2% by mass. The mixed material is compression molded and then subjected to a heat treatment at a temperature between the glass transition temperature and the thermal decomposition temperature of the non-thermoplastic resin. The molded and heat treated structure is indicated to be useful for electric and electronic components such as a motor core or a transformer core.

Liu (U.S. 2010/0054981) describes a system of magnetic nanoparticles which is a composite of a hard magnetic material and a soft magnetic material. For example, a "bimagnetic" $FePt/Fe_3O_4$ nanoparticle is described. Liu describes "warm compaction of the material to produce a bulk nanocomposite magnet.

Hattori et al. (U.S. 2006/0283290) describe silica coated, nitrided iron particles having an average particle diameter of 5 to 25 nm. The particles are "substantially spherical" and are useful for magnetic layers such as a magnetic recording medium.

Ueta et al. (U.S. 2003/0077448) describes a ferromagnetic raw metal powder (primarily iron) having a coating of various oxide materials including silicon. Claim 1 provides a ferromagnetic powder which is surface coated with a silicone resin and a pigment. The coated particle has a diameter on the order of 100 microns. Warm pressing of the powder to produce a core is described as well as annealing of a core at elevated temperature.

Tokuoka et al. (U.S. Pat. No. 7,678,174) describe an iron based powder particle having an iron or iron alloy core and an oxide type insulating coating, including silicon oxide. An ester wax is also added to the particle surface. The coated powder particles are on the order of 200 microns in size as described in Example 1. The lubricated powder is pressure molded to form a molded body and the molded body heat treated.

Blagev (U.S. Pat. No. 5,512,317) describes an acicular magnetic iron oxide particle having a magnetic iron oxide core and a shell containing a silicate compound and cobalt (II) or iron (II) compound as a dopant. The doped acicular particles have a length typically of about 0.15 to 0.50 μm and are employed in magnetic recording media.

Nomura et. al. (U.S. Pat. No. 5,451,245) describes acicular magnetic particles having a largest dimension of about 0.3 μm which are suitable for magnetic recording media. Hydrated iron oxide particles are first coated with an aluminum or zirconium compound, then heated to form a hematite particle. This formed particle is then coated a second time with an aluminum compound followed by a reduction treatment. Silicon compounds may be included in either coating to enhance the properties of the particle.

Tamai et al. (U.S. Pat. No. 5,225,281) describes a coated iron particle having an iron core and a coating containing zirconium, aluminum and silicon. The particle has an average major axis length of 0.1 to 0.5 μm and an average minor axis length of 0.01 to 0.035 μm. Utility of the particle as a magnetic recording medium is described.

Kadono et al. (U.S. Pat. No. 4,920,010) describes an acicular ferromagnetic metal powder particle which is an iron or mainly iron particle having first a silicon compound coating, then a coating of a nonferrous transition metal compound. The acicular particle has a major axis diameter of 0.25 microns. Utility of the particle as a magnetic recording medium is described.

Soileau et al. (U.S. Pat. No. 4,601,765) describes a core obtained by compaction of iron powder which has been coated with an alkali metal silicate and then a silicone resin polymer. The iron particles to which the coating is applied have a mean particle size of 0.002 to 0.006 inches. The core is prepared by compaction of the powder at greater than 25 tons per square inch and then annealing the pressed component.

Tokuoka (U.S. Pat. No. 4,309,459) describes a method to prepare an acicular iron or iron oxide powder where an aqueous iron oxide is mixed with a water soluble silicate and hydrothermally reacted at high pressure. The resulting acicular powder is indicated to be useful as a magnetic recording medium.

Yu et al. (J. Phys. Chem. C 2009. 113, 537-543) describes the preparation of magnetic iron oxide nanoparticles encapsulated in a silica shell. Utility of the particles as magnetic binding agents for proteins is studied.

Tajima et al. (IEEE Transactions on Magnetics, Vol. 41, No. 10, October, 2005) describes a method to produce a powder magnetic core described as warm compaction using die wall lubrication (WC-DWL). According to the method an iron powder coated with a phosphate insulator was compacted under a pressure of 1176 MPa at a temperature of 423° K. to produce a core type structure.

Sun et al. (J. Am. Chem. Soc., 2002, 124, 8204-8205) describes a method to produce monodisperse magnetite nanoparticles which can be employed as seeds to grow larger nanoparticles of up to 20 nm in size.

Bumb et al. (Nanotechnology, 19, 2008, 335601) describes synthesis of superparamagnetic iron oxide nanoparticles of 10-40 nm encapsulated in a silica coating layer of approximately 2 nm. Utility in power transformers is referenced, but no description of preparation of core structures is provided.

None of the above references disclose or suggest a monolithic magnetic core constructed by heated compression of nanoparticular iron oxide encapsulated in a silicon dioxide coating shell, wherein the particles are directly compacted without addition of lubricant or other material to facilitate particle adherence.

SUMMARY OF THE INVENTION

An object of the present invention is to provide a magnetic powder to produce soft magnetic parts, having increased green strength, high temperature tolerance, and good mechanical properties, which parts have minimal or essentially no core loss.

A second object of the invention is to provide a magnetic core having little or no core loss and a third object is to provide a method to produce a magnetic core or shaped core part having little or no core loss.

These and other objects have been achieved according to the present invention, the first embodiment of which provides a magnetic core, comprising:

core shell nanoparticles particles having a particle size of less than 50 nm;
  wherein
  the core is an iron oxide and the shell is a silicon oxide and
  the magnetic core is a monolithic structure of superparamagnetic core grains of iron oxide directly bonded by the silicon oxide shells.

In a second embodiment according to the invention, a space between the individual superparamagnetic nano iron oxide particles of the core is occupied substantially only by the silicon oxide, and in a preferred embodiment, the silicon oxide is silicon dioxide.

In a highly preferred embodiment, according to the present invention the iron oxide core is of the formula: $Fe_3O_4$.

In a further embodiment, the present invention provides a method to prepare a monolithic magnetic core, the magnetic core comprising superparamagnetic core shell particles having a particle size of less than 50 nm; wherein the core consists of superparamagnetic iron oxide and the shell consists of silicon dioxide; the method comprising sintering superparamagnetic core shell particles having a particle size of less than 50 nm under pressure under flow of an inert gas to obtain a monolithic structure; wherein the core of the core shell particle consists of superparamagnetic iron oxide and the shell consists of silicon dioxide.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 1 shows a XRD spectrum of a grain sample prepared in Example 1.

FIG. 2 shows a toroid prepared in the Example.

DETAILED DESCRIPTION OF THE INVENTION

Applicant has recognized that to increase magnetic core efficiency as measured in terms of core loss, the magnetic core must demonstrate a reduced measure of magnetic hysteresis as well as lowered eddy current formation. Applicant has surprisingly discovered that by producing superparamagnetic iron oxide nanoparticles that are encapsulated in silica shells and then compacting and sintering these nanoparticles into a monolithic nanomaterial core, the core obtained has zero (or very low) hysteresis and very low eddy current formation because of the insulating silica shells.

According to the invention, the iron oxide nanoparticle grains are of or approaching the size of the single particle magnetic domain of the iron oxide and thus are superparamagnetic. While not being constrained to theory, Applicant believes control of grain size to approximately that of the particle magnetic domain is a factor which contributes to the reduced hysteresis of a magnetic core according to the present invention. Moreover, the presence of insulating silica shells about the core grains is a factor which contributes to the low eddy current formation of a magnetic core according to the present invention.

Figure 4:
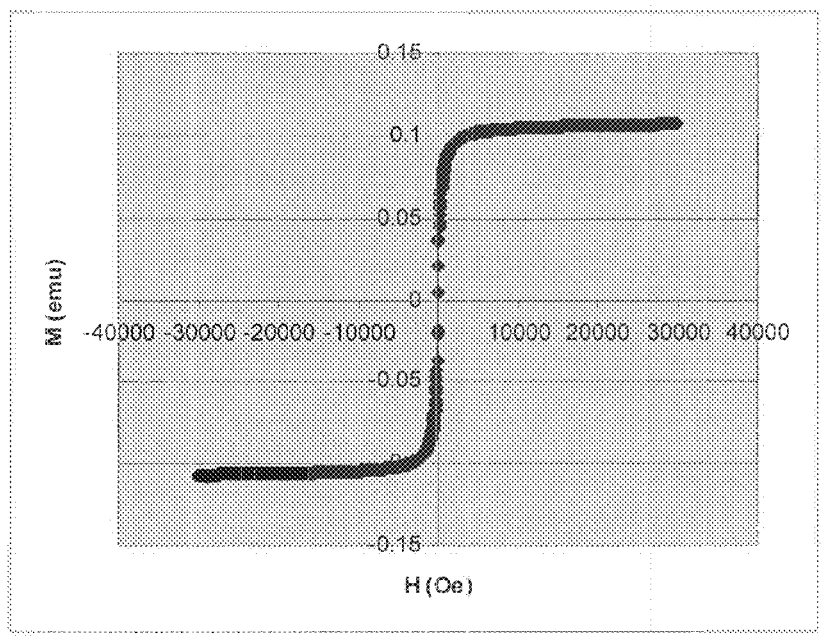
FIG. 4 shows a generalized relationship of particle size and range of superparamagnetism.
Figure 5:
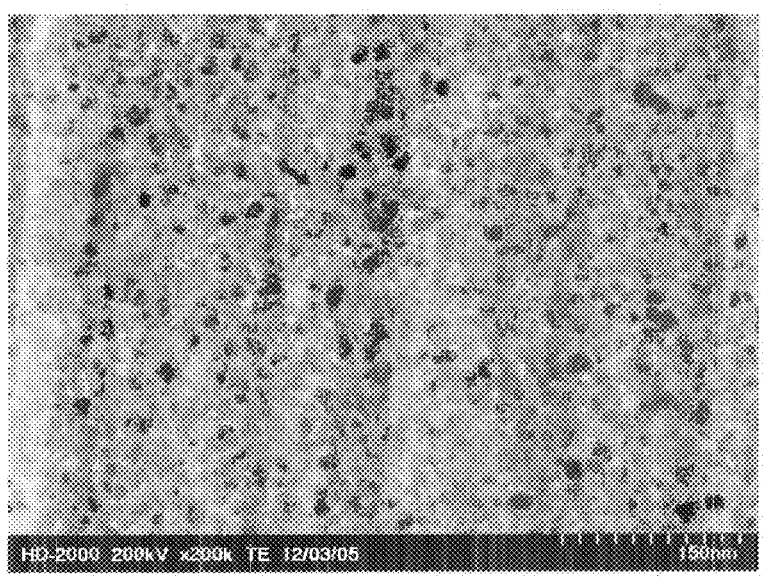
FIG. 5 shows a TEM image of superparamagnetic $Fe_3O_4$/$SiO_2$ nanocomposite according to one embodiment of the invention.

It is conventionally known that the range of particle size for which single domain particles exhibit superparamagnetism has an upper boundary characteristic of the particle chemical constitution. This phenomenon is shown in FIG. 4 which is reproduced from Nanomaterials An Introduction to Synthesis, Properties and Applications by Dieter Vollath (page 112) Wiley-VCH. According to FIG. 4, above a certain size range, nanoparticles will exhibit a measurement time dependency characteristic of ferromagnetic behavior. To avoid this time dependency nanoparticles of a size within the range of superparamagnetism must be prepared and maintained.

Thus, the first embodiment of the invention is a magnetic core, comprising: core shell nanoparticles having a particle size of less than 50 nm; wherein the core is an iron oxide and the shell is a silicon oxide and the magnetic core is a monolithic structure of superparamagnetic core grains of iron oxide directly bonded by the silicon oxide shells. Preferably the particle size is from 3 to 35 nm and most preferably from 5 to 15 nm. These ranges include all subranges and values there between.

The core according to the present invention is monolithic, having the space between the iron oxide nanoparticle grains occupied by the silicon oxide. Preferably at least 97% of the space between the grains, preferably 98% and most preferably 100% of the space is silicon oxide and further most preferably the silicon oxide is silicon dioxide. According to the present invention neither any binder nor any resin is contained in the matrix of the monolithic core.

The monolithic core according to the present invention is obtained by a process comprising sintering a powder of supermagnetic core shell particles having a particle size of less than 50 nm under pressure under flow of an inert gas to obtain a monolithic structure; wherein the core of the core shell particle consists of superparamagnetic iron oxide and the shell consists of silicon dioxide. Because a magnetic material is only superparamagnetic when the grain size is near or below the magnetic domain size (~25 nm for magnetite), the nanoparticle core must be maintained as small as possible, or the sample will become ferromagnetic, and express magnetic hysteresis. Therefore, the most mild and gentle sintering conditions that still yield a monolithic sample that is robust enough to be machined into a toroid are desired, because more aggressive sintering conditions will promote unwanted grain growth and potentially, loss of superparamagnetic performance.

Figure 3:
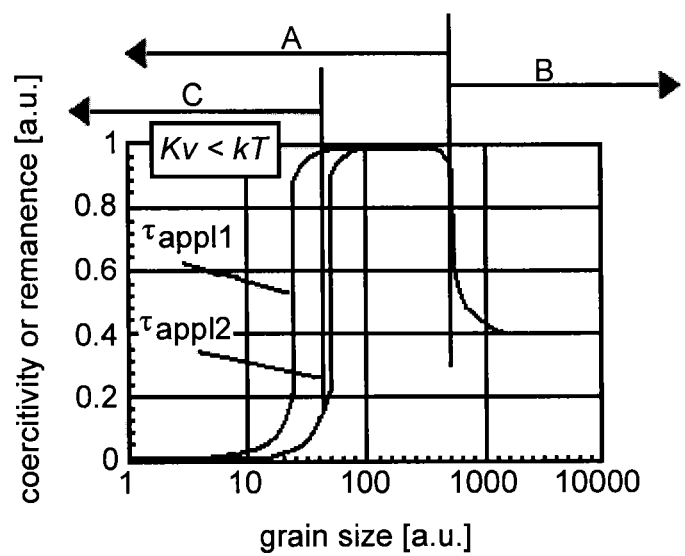
FIG. 3 shows a M(H) curve for the supermagnetic $Fe_3O_4$/$SiO_2$ nanocomposite according to one embodiment of the invention.

As indicated in the hysteresis curve shown in FIG. 3, the nanocomposite material, sintered by hot pressing, thus obtained is clearly superparamagnetic. Additionally, the TEM image of the nanocomposite shows that core nanoparticles of $Fe_3O_4$ having particle size in the 10 to 25 nm range are retained in the formation of the core material according to the method of the invention. This data clearly indicates that a monolithic core may be generated from the iron oxide/silicon oxide core shell nanoparticles according to the invention under sufficiently mild conditions to maintain the superparamagnetic state of the nanoparticles.

Having generally described this invention, a further understanding can be obtained by reference to certain specific examples which are provided herein for purposes of illustration only and are not intended to be limiting unless otherwise specified. Skilled artisans will recognize the utility of the devices of the present invention as a battery as well as the general utility of the electrolyte system described herein.

EXAMPLES

Core/shell $Fe_3O_4/SiO_2$ nanoparticles were synthesized as follows: iron trichloride and iron dichloride were co-dissolved in water. The addition of $NH_4OH/H_2O$ initiated the iron oxide nanoparticle formation. Tetraethyl orthosilicate, catalyzed by triethylamine, was then used to deposit the silica shell onto the magnetite nanoparticles.

The $Fe_3O_4/SiO_2$ core/shell nanoparticles were sintered under heat and pressure with a flowing argon atmosphere, using graphite punch and dies.

Because a magnetic material is only superparamagnetic when the grain size is near or below the magnetic domain size (~25 nm for magnetite), the nanoparticle core must be maintained as small as possible, or the sample will become ferromagnetic, and express magnetic hysteresis. Therefore, the most mild and gentle sintering conditions that still yield a monolithic sample that is robust enough to be machined into a toroid are desired, because more aggressive sintering conditions will promote unwanted grain growth.

Grain Size Analysis by XRD

XRD spectrometry was conducted on the sintered samples to confirm that a magnetite crystal structure is present. An example of the XRD spectrum is shown in FIG. 1. The average grain size of all samples, as calculated from their respective XRD spectra, only ranged from 10 to 11 nm.

Toroid and Inductor Fabrication

The product of the hot press sintering is a disc. The size of the disk is dependent upon the size of punch and die set used. As described here but not limiting the dimensions of those stated, discs were produced that were 9 mm in diameter and 2.5 mm thick. The disc was converted to a toroid through conventional machining techniques.

The fabricated toroid was hand-wound with copper enameled wire to produce an inductor, see FIG. 2.

The invention claimed is:
1. A magnetic core, comprising:
a monolithic structure of a plurality of superparamagnetic nanoparticle grains of iron oxide in a silica matrix;
wherein
a space between individual superparamagnetic nano iron oxide grains is occupied substantially only by the silica matrix, and
the magnetic core is obtained by compaction and sintering of a plurality of superparamagnetic core shell nanoparticles having a core of iron oxide, a shell of a silicon oxide and a particle size of less than 50 nm.
2. The magnetic core according to claim 1, wherein the iron oxide is of the formula: $Fe_3O_4$.
3. The magnetic core according to claim 1, wherein the particle size of the core shell nanoparticles prior to the compaction and sintering to the monolithic structure is less than 15 nm.

4. The magnetic core according to claim 1, wherein at least 97% by volume of the space of the matrix between the iron oxide grains is occupied by silicon dioxide.

5. The magnetic core according to claim 1, wherein an average nanoparticle iron oxide grain size as measured by XRD is less than 15 nm.

6. A method to prepare the magnetic core of claim 1, comprising:
- sintering superparamagnetic core shell nanoparticles having a particle size of less than 50 nm under heat and pressure and under flow of an inert gas to obtain the monolithic structure;
- wherein the core of the core shell nanoparticle consists of superparamagnetic iron oxide and the shell consists of silicon dioxide.

7. The method according to claim 6, wherein the particle size of the superparamagnetic nanoparticles is less than 15 nm.

8. An electrical/magnetic conversion device, which comprises the magnetic core according to claim 1.

9. A vehicle part comprising the electrical/magnetic conversion device according to claim 8, wherein the part is selected from the group consisting of a motor, a generator, a transformer, an inductor and an alternator.

\* \* \* \* \*